United States Patent [19]

Brown

[11] 4,186,597
[45] Feb. 5, 1980

[54] TORQUE METER MEANS WITH REVERSE ROTATION DETECTION

[75] Inventor: Winthrop K. Brown, Bellaire, Tex.

[73] Assignee: Texaco Inc., White Plains, N.Y.

[21] Appl. No.: 900,964

[22] Filed: Apr. 28, 1978

[51] Int. Cl.² ............................................. G01L 3/10
[52] U.S. Cl. ................................ 73/136 A; 324/83 D
[58] Field of Search .................... 73/136 A; 324/85 D

[56] References Cited

U.S. PATENT DOCUMENTS

| 3,640,131 | 2/1972 | Turk | 73/136 A |
| 3,646,455 | 2/1972 | Coccagna | 324/83 D |
| 4,020,685 | 5/1977 | Van Millingen | 73/136 A |

*Primary Examiner*—Charles A. Ruehl
*Attorney, Agent, or Firm*—Robert A. Kulason; Carl G. Ries; Ronald G. Gillespie

[57] ABSTRACT

A torque meter which measures the torque of a rotating shaft includes at least two sensors. Portions of each sensor are fixed to the shaft. The sensors provide shaft pulse signals at the same frequency but having a phase difference corresponding to the torque experienced by the shaft. A clock provides clock pulses. A detection network detects reverse rotation of the shaft in accordance with the shaft pulse signals and provides a detection signal. A circuit connected to the sensors and to the clock provides first groups of pulses in accordance with the shaft pulse signals so that the number of pulses in each group of the first group of pulses corresponds to the torque experienced by the shaft at a constant speed. A first counting network counts the pulses from the circuit. Another circuit connected to the clock provides second groups of pulses and is responsive to the speed of shaft rotation so that a ratio of a group of pulses from the first group of pulses to a corresponding group of pulses from the second group of pulses averages out errors due to the shaft rotation and the sensors. A second counting network counts the pulses from the second pulse means. Both counting networks are reset every revolution of the shaft. An output circuit provides an output corresponding to the torque experienced by the shaft in accordance with the ratio of the counts in the counting networks.

18 Claims, 13 Drawing Figures

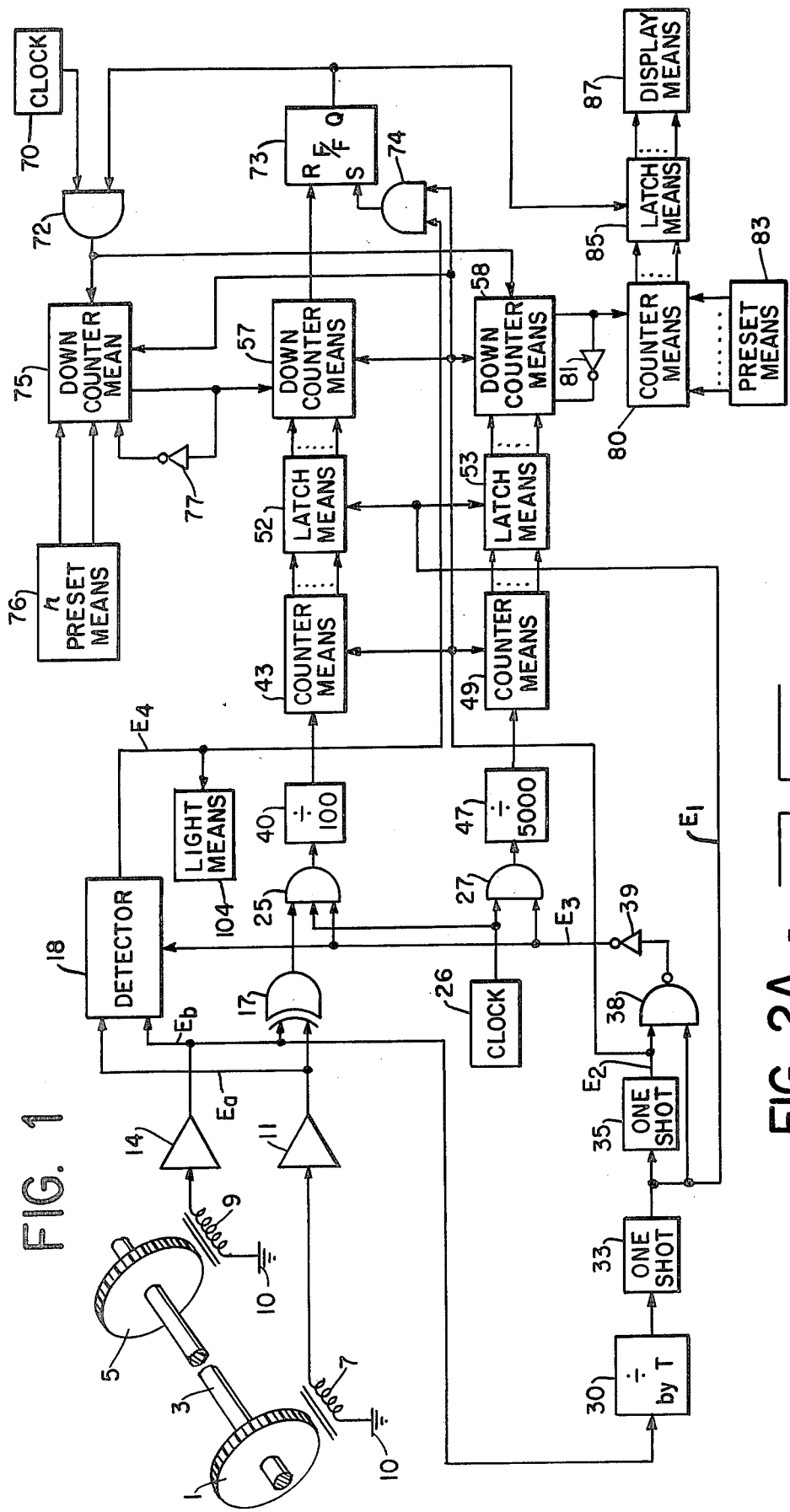

FIG. 3A  $E_b$  
FIG. 3B  $E_a$  
FIG. 3C  $E_b$  
FIG. 3D  $E_a$  
FIG. 3E  $E_b$  
FIG. 3F  $E_a$  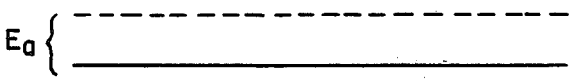
FIG. 3G  $E_b$  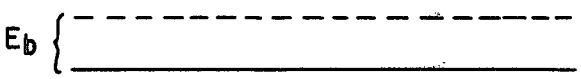
FIG. 3H  $E_a$  
FIG. 4
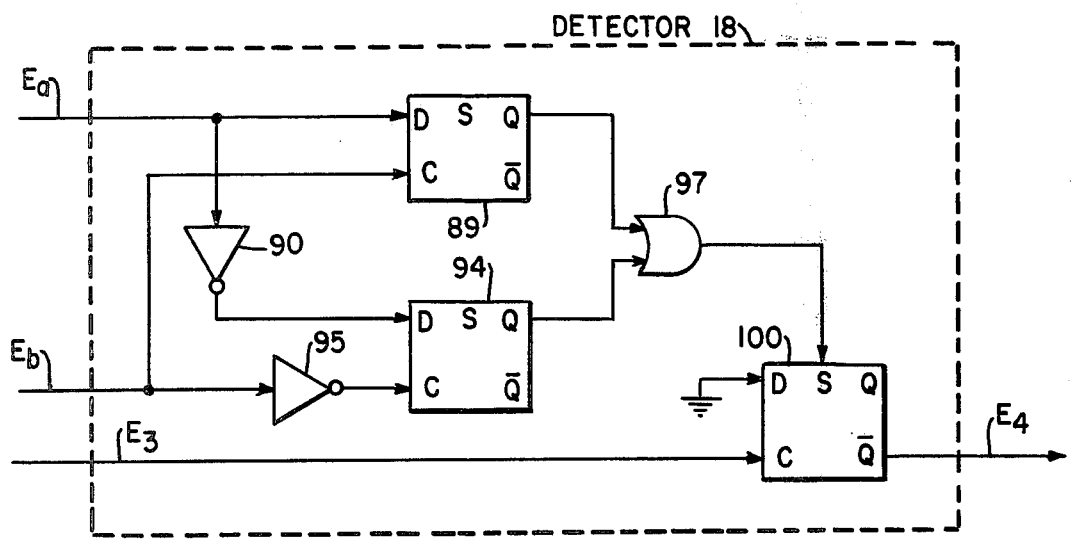

TORQUE METER MEANS WITH REVERSE ROTATION DETECTION

BACKGROUND OF THE INVENTION

Field of the Invention

The present invention relates to meters in general and, more particularly, to torque meters.

SUMMARY OF THE INVENTION

A torque meter which measures the torque of a rotating shaft includes at least two sensors. A portion of each sensor is affixed to the shaft. The sensors provide shaft pulse signals at the same frequency but having a phase difference corresponding to the torque experienced by the shaft. A detector connected to the sensors provides a detection signal corresponding to the direction of rotation of the shaft. A clock provides clock pulses. A circuit connected to the sensors and to the clock provides first group pulses in accordance with the shaft pulse signals so that the number of pulses in each group of the first groups of pulses corresponds to the torque experienced by the shaft at a constant speed. A first count network counts the pulses provided by the circuit. Another network connected to the clock provides second groups of pulses and is responsive to the speed of the shaft rotations so that a ratio of a group of pulses from the first groups of pulses to a corresponding group of pulses from the second groups of pulses averages out errors due to the speed of shaft rotation and the positions of the sensors. A second counting network counts the pulses in the second group of pulses. A circuit provides a reset pulse for resetting the counting networks each revolution of the shaft. An output network connected to both counting networks and to the detector provides an output corresponding to the torque experienced by the shaft rotating in the proper direction in accordance with the ratio of the counts in the counting networks and the detection signal.

The objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE DRAWINGS

FIG. 1 is a simplified block diagram of a torque meter, constructed in accordance with the present invention, for measuring the torque experienced by a rotating shaft.

FIGS. 2A through 2C are graphical representations of pulses occurring during the operation of the torque meter shown in FIG. 1.

FIGS. 3A through 3H are graphical representations of signals $E_a$ and $E_b$.

FIG. 4 is a detailed block diagram of the detector shown in FIG. 1.

DESCRIPTION OF THE INVENTION

Referring to FIG. 1, there is shown a torque meter having a wheel 1, with teeth, mounted on a shaft 3. At another location on shaft 3, there is mounted another wheel 5 substantially identical to wheel 1. As shaft 3 rotates, the teeth in wheels 1, 5 pass pick-up coils 7 and 9, respectively, which are connected to ground 10; each coil has a magnetized core. An alternate arrangement would have each tooth of the wheels magnetized instead of the cores of the coils. As each tooth passes a corresponding coil an electric voltage is induced therein so that during rotation of shaft 3, coils 7 and 9 provide pulses.

The pulses from coils 7, 9 are applied to squaring amplifiers 11 and 14, respectively. Squaring amplifiers 11 and 14 may be omitted if the pulses provided by coils 7, 9 are suitable. Squaring amplifiers 11, 14 provide shaft pulse signals $E_a$ and $E_b$, respectively, shown in FIGS. 3B and 3A, respectively, to an exclusive OR gate 17 and to a detector 18.

When amplifiers 11, 14 are simultaneously providing a pulse, exclusive OR gate 17 provides a low logic level output. When one and only one of the amplifiers 11 or 14 is not providing a pulse, exclusive OR gate 17 provides a high logic level output. If both amplifiers 11 and 14 are not providing a pulse exclusive OR gate 17 produces a low output. Thus, the duration of a high output from exclusvie OR gate 17 corresponds to the torque experienced by shaft 3 for a given speed. The output from exclusive OR gate 17 is applied to an AND gate 25.

Detector 18 determines if shaft 3 is rotating in a reverse direction or if amplifier 11 is producing noise or vibration pulses.

A clock 26 provides clock pulses to AND gate 25 and to another AND gate 27.

The shaft pulse signal $E_b$ from amplifier 14 is provided to a divider 30 which divides the pulses by a number equal to the number of teeth on wheel 1 or 5. Each pulse provided by divider 30 triggers a one-shot 33 to provide a negative going 'enter' pulse $E_1$, shown in FIG. 2A. Pulses $E_1$ are provided to another one-shot 35 triggering it to provide a negative going 'reset' pulse $E_2$, shown in FIG. 2B. Pulses $E_1$, $E_2$ are applied to a NAND gate 38 causing it in effect to provide a positive going pulse. The positive going pulse is applied to an inverter 39 which provides a negative going pulse $E_3$, as shown in FIG. 2C. Pulse $E_3$ is provided to AND gates 25, 27 and effectively disables them for the duration of the pulse $E_3$ so that any counting as hereinafter explained would not occur during the occurrence of pulses $E_1$, $E_2$.

The clock pulses from clock 26 pass through AND gate 25 when the signal from exclusive OR gate 17 is at a high level and while there is an absence of pulse $E_3$. The passed pulses from AND gate 25 are provided to a 'divide by 100' divider 40. The pulses from divider 40 are applied to counter means 43 which counts them in an up direction. Similarly, clock pulses from clock 26 pass through AND gate 27, during the absence of a pulse $E_3$, and are applied to a 'divide by 5,000' divider 47 whose pulses are applied to counting means 49. It should be noted at this point that counter means 43 contains a count corresponding to a phase difference while counter means 49 contains a count corresponding to the time duration of one cycle of the torque meter. Counter means 43 and 49 are periodically reset to zero by 'reset' pulse $E_2$ from one-shot 35 and provide digital signals corresponding to the counts to latch means 52 and 53, respectively. Latch means 52 and 53 store the digital signals from counter means 43 and 49 in response to a pulse $E_1$ from one-shot 33. Thus the sequence of events is such that latch means 52 and 53 store the digital signals from counter means 43 and 49, respectively, and then counter means 43 and 49 are reset to zero. Latch means 52 and 53 provide digital signals to down counter means 57 and 58, respectively.

A clock 70 provides clock pulses to an AND gate 72. AND gate 72 is controlled by the output of a flip-flop 73 to pass or block the clock pulses from clock 70. Flip-flop 73 is set by a passed pulse from an AND gate 74 receiving pulses $E_2$ and which is controlled by a signal $E_4$ from detector 18 as hereinafter explained. Pulses passed by AND gate 72 are provided to down counter means 75, 58. Preset means provides signals corresponding to a predetermined multiplication factor N to down-counter means 75 so that the counting down of counter means 75 repeats until AND gate 72 is disabled. Down-counter means 57 provides a pulse output upon reaching zero count to reset flip-flop 73, thereby disabling AND gate 72 and stops the passage of the clock pulses from clock 70 so that the number of pulses passed by AND gate 72 corresponds to the product of N and the count in counter means 43. Since the count in counter means 49 is less than or equal to N times the count in counter means 43, the pulses provided by AND gate 72 cause counter means 58 to count down to a zero count repeatedly. When the count in counter means 58 reaches zero, it provides a pulse to another counter means 80 and to inverter 81. Inverter 81 inverts the pulse and provides it back to counter means 58 causing it to load in the digital signals from latch means 53, so that the counting down of counter means 58 keeps repeating. When flip-flop 73 is reset by counter means 57, the count in counter means 80 corresponds to the product N and the count in counter means 43 divided by the count in counter means 49. The count in counter means 80 also corresponds to the torque experienced in shaft 3.

Preset means 83 may be utilized to preset a count into counter means 80 corresponding to any alignment error between wheels 1 and 5.

Latch means 85 receives digital signals from counter means 80, corresponding to the count, and is controlled by the output from flip-flop 73 to enter the digital signals. Latch means 85 provides digital signals to display means 87, which may be of a conventional type, for providing a display corresponding to the torque experienced by shaft 3.

Referring now to FIGS. 1, 3A through 3H, and 4, detector 18 determines whether the shaft is rotating in a wrong direction or that amplifier 14 is providing pulses as a result of vibration or noise. Should either of these conditions occur, the current erroneous data is prevented from entering latch means 85 so that latch means 85 provides the latest valid data.

Pulses $E_b$ are applied to the clock or 'C' input of 'D' type flip-flop 89 and to an inverter 95, while pulses $E_a$ are applied to the data or 'D' input of 'D' type flip-flop 89 and to an inverter 90. Inverters 90, 95 provide inverted pulses $E_a$ and $E_b$, respectively, to the 'C' input and the D input, respectively, of flip-flop 94. The Q outputs of flip-flops 89, 94 are provided to an OR gate 97. OR gate 97 is connected to a set or 'S' input of yet another 'D' type flip-flop 100. Pulses $E_3$ are applied to the 'C' input of flip-flop 100 while flip-flop 100 'D' input is grounded. Flip-flop 100 provides its Q output as signals $E_4$. A 'D' type flip-flop will provide its Q and $\bar{Q}$ outputs at low and high logic levels, respectively, when in a clear state and at high and low logic levels, respectively, when in a set state. Further, when an input of one logic level is applied to the 'D' input, the flip-flop is triggered by a rising pulse to provide a Q output at the same logic level as provided to the 'D' input.

In normal operation, pulses $E_a$ lag pulses $E_b$. Thus, when pulse $E_b$ is rising pulse $E_a$ is low so that flip-flop 89 is triggered to provide its Q output at a low logic level. Similarly, due to the effect of inverters 90 and 95, flip-flop 94 is triggered by the trailing edge of pulses $E_b$ to provide its Q output at a low logic level. Thus for normal rotation both flip-flops 89, 94 provide low logic level Q outputs to OR gate 97 causing it to provide a low logic level output to flip-flop 100. Flip-flop 100 is not affected by the low logic level output from OR gate 97 and continues to provide signal $E_4$ at a high logic level which allows AND gate 74 to pass a pulse $E_2$ so that flip-flop 73 is set. This causes latch means 85 to enter the signals from counter means 80.

When reverse rotation occurs, pulses $E_a$ lead pulses $E_b$ as is shown in FIGS. 3C and 3D so that pulse $E_a$ is at a high level when pulse $E_b$ rises. In response to this condition, flip-flop 89 is triggered to provide its Q output at a high logic level. Once this occurs, flip-flop 94 is of no importance. Since flip-flop 89 is at a high logic level, OR gate 97 provides a high level output triggering flip-flop 100 to a set state. While in a set state, flip-flop 100 provides signal $E_4$ at a low logic level to disable AND gate 74 to prevent the entry of data into latch means 85 by not allowing flip-flop 73 to be set. Thus latch means 85 provides signals corresponding to the last valid data obtained. Further, signal $E_4$ is going to a low logic level causes a light means 104 to light thus visibly indicating malfunctioning. Light means 104 does not light when signal $E_4$ is at a high logic level.

Signal $E_3$, as can be seen in the description regarding FIG. 1, is a pulse which occurs every cycle. Its occurrence when flip-flop 100 is in a set state, resets flip-flop 100 to a clear state causing signal $E_4$ to go to a high logic level. Latch means 85 can then again enter valid data.

When noise or vibration causes an amplifier 11 or 14 to provide an erroneous output, that condition may be seen either in FIGS. 3E, 3F or 3G, 3H. With regard to FIGS. 3F and 3G, the output of an amplifier 11 or 14 should be at a steady state, which may be at a high logic level or at a low logic level. The solid line is for a low logic level, while the dash line represents a high logic level steady output. When pulse $E_a$ does not occur and the output of amplifier 11 is at a high logic level, flip-flop 89 is triggered by the leading edge of a pulse $E_b$. Similarly, if the signal from amplifier 11 is at a steady state low logic level, the trailing edge of a pulse $E_b$ triggers flip-flop 94 to provide its Q output at a high logic level. As noted hereinbefore, a high logic level Q ouput from either flip-flop 89 or 94, causes flip-flop 100 to be triggered to a set state.

A final erroneous condition, that is where amplifier 14 provides a steady state signal, while noise or vibration cause amplifier 11 to provide pulses $E_a$, is not controlled by detector 18 but by the inherent operation of system itself. Since amplifier 14 is not providing pulses $E_b$, 'divide by T' 30 does not provide a pulse therefor, latch means 85 cannot enter the erroneous data.

It would be obvious to one skilled in the art that if only reverse rotation was to be detected flip-flop 89 would be needed solely or in conjunction with flip-flop 106. For the solo case, flip-flop 89 would provide its output as signal $E_4$ and there would be no cyclic resetting of flip-flop 89. The resetting would occur with normal rotation.

The invention hereinbefore described is a digital torque meter for measuring the torque on a rotating shaft. The torque is determined by developing two signals whose difference in phase corresponds to the torque experienced by the shaft. The phase difference is then used to generate pulses corresponding in number to the torque. The pulses are then counted, displayed and recorded. The torque meter does not record any display erroneous data due to reverse rotation of the shaft or due to vibration of noise.

What is claimed is:

1. A torque meter for measuring the torque of a rotating shaft comprising at least two sensing means, portions of which are affixed to the shaft, for providing shaft pulse signals at the same frequency but having a phase difference corresponding to the torque experienced by the shaft, first clock means for providing clock pulses, detection means connected to the two sensing means for providing a detection signal corresponding to the direction of rotation of the shaft, circuit means connected to the two sensing means and to said first clock means for providing first groups of pulses in accordance with the shaft pulse signals so that the number of pulses in each group of the first groups of pulses corresponds to the torque experienced by the shaft, first counting means for counting the pulses from the circuit means, pulse means connected to said first clock means for providing second groups of pulses and responsive to the shaft rotation so that a ratio of a group of pulses from said first groups of pulses to a corresponding group of pulses from the second groups of pulses averages out errors due to the shaft rotation; second counting means connected to the pulse means for counting the pulses from the pulse means, control pulse means connected to both counting means for resetting the counting means each revolution of the shaft, and ratio means connected to both counting means and to the detection means for providing an output corresponding to the torque experienced by the shaft in accordance with the ratio of the counts in the counter means and the detection signal.

2. A torque meter described in claim 1 in which each sensing means includes a wheel having teeth mounted on the shaft, and coil means placed adjacent to the wheel providing a pulse each time a tooth on the wheel passes the coil means.

3. A torque meter as described in claim 1 in which the control pulse means also provides 'enter' pulses and 'disabling' pulses; and the circuit means includes an exclusive OR gate connected to the coil means for providing a high logic level signal when the shaft pulse signals are not at substantially the same amplitude and for providing a low logic level signal when the shaft pulse signal amplitudes are substantially the same, and a first AND gate connected to the exclusive OR gate, the first clock means and to the control pulse means, said first AND gate being controlled by the 'disabling' pulses so that the first AND gate will not pass clock pulses while an 'enter' pulse or a 'reset' pulse is being provided by the control pulse means.

4. A torque meter as described in claim 3 in which the first counting means includes first dividing means connected to the first AND gate for dividing the pulses from the first AND gate by a first predetermined factor and providing pulses corresponding to the division, a first counter connected to the first dividing means and to the control pulse means for counting the pulses provided by the first dividing means and being periodically reset by the 'reset' pulses from the control pulse means and providing digital signals corresponding to the count, first latch means connected to the first counter and to the control pulse means and controlled by the 'enter' pulses to periodically enter the digital signals from the first counting means.

5. A torque meter as described in claim 4 in which the pulse means includes a second AND gate connected to the first clock means and to the control pulse means for passing clock pulses during the absence of a disabling pulse from the control pulse means and for blocking clock pulses during the occurrence of a disabling pulse; and the second counting means includes second dividing means for dividing pulses passed by the second AND gate by a predetermined factor substantially greater than the dividing factor of the first dividing means and providing pulses corresponding to the division, a second counter connected to the second dividing means counts the pulses provided by the second dividing means and provides digital signals corresponding to the count and being periodically reset by the 'reset' pulses from the control pulse means, second latch means connected to the second counter for periodically entering and storing the digital signals from the second counter in response to 'enter' pulses from the control pulse means.

6. A torque meter as described in claim 5 in which the ratio means includes second clock means providing clock pulses, a third AND gate connected to the second clock means, a fourth AND gate connected to the detection means and receiving 'enter' pulses which is controlled by the detection signal to pass or block the 'enter' pulses, a flip-flop having 'R' and 'S' inputs and a Q output connected to the third AND gate, said 'S' input being connected to fourth AND gate so that a passed 'enter' pulse from the fourth AND gate triggers the flip-flop to a set state causing a high logic level signal to be provided at the Q output, thus enabling the third AND gate to pass the clock pulses from the second clock means, third counting means to the control pulse means, to the 'R' input of the flip-flop, to the third AND gate and to the first latch means for entering the digital signals from the first latch means, so as to be an entered count, in response to an 'enter' pulse from the control pulse means and for counting down the entered count in response to passed clock pulses from the third AND gate and for providing a pulse output upon reaching a zero count to the flip-flop so that the flip-flop changes state to provide a low logic level signal at its Q output thereby disabling the third AND gate to prevent further passage of clock pulses from the second clock means, fourth counting means connected to the second latch means in response to an 'enter' pulse from the control pulse means and counting down passed clock pulses from the third AND gate to provide a pulse output upon reaching zero which causes the fourth counter means to reset itself and to enter the digital signals provided by the second latch means, fifth counting means connected to the fourth counter means, and third latch means connected to the fifth counting means and to the flip-flop means for entering digital signals provided by the fifth counting means in response to the flip-flop means output changing to a low logic level and providing digital signals corresponding to the stored count and to the ratio of counts in the first and second counters, and display means connected to the third latch means for providing a display corresponding to the torque experienced by the shaft in accordance with the digital signal from the third latch means.

7. A torque meter as described in claim 6 in which the ratio means further comprises means for multiplying the ratio by a predetermined factor.

8. A torque meter as described in claim 7 in which the multiplying means includes preset means providing digital signals corresponding to predetermined multiplication factor, and sixth counting means connected to the preset means between the third AND gate and the third counting means for entering a count in accordance with the digital signals and for counting down the count in accordance with the pulses passed by the third AND gate and providing a pulse output to the third counting means each time the count reaches zero and providing a pulse to preset the sixth counting means so that the counting down of the sixth counting means repeats until the third AND gate is disabled.

9. A torque meter as described in claim 8 in which the detection means includes three 'D' type flip-flops, each flip-flop having 'D', 'C' and 'S' inputs and Q and $\overline{Q}$ outputs, one flip-flop has its 'C' and 'D' inputs connected to different coil means, a pair of inverters connecting the 'C' and 'D' inputs of another flip-flop to different coil means so that when the pulse signals at the 'D' inputs are at high logic levels, rising pulses at the 'C' inputs cause the flip-flops to provide low logic level signals at their Q outputs, an OR gate connected to the Q outputs of the two flip-flops which provide a high logic level output when at least one of the two flip-flops provides a low logic level signal when the two flip-flops provide low logic level signals at their Q outputs, and the remaining flip-flop has its 'C' input connected to the control pulse means its $\overline{Q}$ output connected to the fourth AND gate, its 'S' input connected to the OR gate and being triggered to a set state when the OR gate provides a high logic level signal so as to provide a low logic level signal at it $\overline{Q}$ output as the detection signal to control the fourth AND gate to block the block the 'enter' pulses and returning to a clear state when a disabling pulse from the control pulse means is applied to its 'C' input so as to provide a high logic level signal at its $\overline{Q}$ output as the detection signal to control the fourth AND gate to pass the 'enter' pulses.

10. A torque meter for measuring the torque of a rotating shaft comprising at least two sensing means, portions of which are affixed to the shaft, for providing shaft pulse signals at the same frequency but having a phase difference corresponding to the torque experienced by the shaft, first clock means for providing clock pulses, detection means connected to the two sensing means for sensing when the shaft is not rotating in a predetermined direction or when an erroneous shaft pulse signal from at least one of the sensing means occurs and providing a detection signal corresponding thereto, circuit means connected to the two sensing means and to the first clock means for providing first groups of pulses in accordance with the shaft pulse signals so that the number of pulses in each group of the first groups of pulses corresponds to the torque experienced by the shaft, first counting means for counting the pulses from the circuit means, pulse means connected to the first clock means for providing second groups of pulses and responsive to the shaft rotation so that a ratio of a group of pulses from the first groups of pulses to a corresponding group of pulses from the second groups of pulses averages out errors due to the shaft rotation; second counting means connected to the pulse means for counting the pulses from the pulse means, control pulse means connected to both counting means for resetting the counting means each revolution of the shaft, and ratio means connected to both counting means and to the detection means for providing an output corresponding to the torque experienced by the shaft in accordance with the ratio of the counts in the counting means and the detection signal.

11. A torque meter described in claim 10 in which each sensing means includes a wheel having teeth mounted on the shaft, and coil means placed adjacent to the wheel providing a pulse each time a tooth on the wheel passes the coil means.

12. A torque meter as described in claim 11 in which the control pulse means also provides 'enter' pulses and 'disabling' pulses; and the circuit means includes an exclusive OR gate connected to the coil means for providing a high logic level signal when the shaft pulse signals are not at substantially the same amplitude and for providing a low logic level signal when the shaft pulse signal amplitudes are substantially the same, and a first AND gate connected to the exclusive OR gate, to the first clock means and to the control pulse means, said first AND gate being controlled by the 'disabling' pulses so that the first AND gate will not pass clock pulses while an 'enter' pulse or a 'reset' pulse is being provided by the control pulse means.

13. A torque meter as described in claim 12 in which the first counting means includes first dividing means connected to the first AND gate for dividing the pulses from the first AND gate by a first predetermined factor and providing pulses corresponding to the division, a first counter connected to the first dividing means and to the control pulse means for counting the pulses provided by the first dividing means and being periodically reset by the 'reset' pulses from the control pulse means and providing digital signals corresponding to the count, first latch means connected to the first counter and to the control pulse means and controlled by the 'enter' pulses to periodically enter the digital signals from the first counting means.

14. A torque meter as described in claim 13 in which the pulse means includes a second AND gate connected to the first clock means and to the control pulse means for passing clock pulses during the absence of a disabling pulse from the control pulse means and for blocking clock pulses during the occurrence of a disabling pulse, and the second counting means includes second dividing means for dividing pulses passed by the second AND gate by a predetermined factor substantially greater than the dividing factor of the first dividing means and providing pulses corresponding to the division, a second counter connected to the second dividing means counts the pulses provided by the second dividing means and provides digital signals corresponding to the count and being periodically reset by the 'reset' pulses from the control pulse means, second latch means connected to the second counter for periodically entering and storing the digital signals from the second counter in response to 'enter' pulses from the control pulse means.

15. A torque meter as described in claim 14 in which the ratio means includes second clock means providing clock pulses, a third AND gate connected to the second clock means, a fourth AND gate connected to the detection means and receiving 'enter' pulses which is controlled by the detection signal to pass or block the 'enter' pulses, a flip-flop having 'R' and 'S' inputs and a Q output connected to the third AND gate, said 'S' input being connected to fourth AND gate so that a passed 'enter' pulse from the fourth AND gate triggers the flip-flop to a set state causing a high logic level signal to be provided at the Q output thus enabling the third AND gate to pass the clock pulses from the second clock means, third counting means connected to the control pulse means, to the 'R' input of the flip-flop, to the third AND gate, and to the first latch means for entering the digital signals from the first latch means, so as to be an entered count, in response to an 'enter' pulse from the control pulse means and for counting down the entered count in response to passed clock pulses from the third AND gate and for providing a pulse output upon reaching a zero count to the flip-flop so that the flip-flop changes state to provide a low logic level at its Q output thereby disabling the third AND gate to prevent further passage of clock pulses from the second clock means, fourth counting means connected to the second latch means in response to an 'enter' pulse from the control pulse means and counting down passed clock pulses from the third AND gate to provide a pulse output upon reaching zero which causes the fourth counter means to reset itself and to enter the digital signals provided by the second latch means, fifth counting means connected to the fourth counter means, and third latch means connected to the fifth counting means and to the flip-flop means for entering digital signals provided by the fifth counting means in response to the flip-flop means output changing to a low logic level and providing digital signals corresponding to the stored count and to the ratio of counts in the first and second counters, and display means connected to the third latch means for providing a display corresponding to the torque experienced by the shaft in accordance with the digital signal from the third latch means.

16. A torque meter as described in claim 15 in which the ratio means further comprises means for multiplying the ratio by a predetermined factor.

17. A torque meter as described in claim 16 in which the multiplying means includes preset means providing digital signals corresponding to a predetermined multiplication factor, and sixth counting means connected to the preset means between the third AND gate and the third counting means for entering a count in accordance with the digital signals and for counting down the count in accordance with the pulses passed by the third AND gate and providing a pulse output to the third counting means each time the count reaches zero and providing a pulse to preset the sixth counting means so that the counting down of the sixth counting means repeats until the third AND gate is disabled.

18. A torque meter as described in claim 17 in which the detection means includes three 'D' type flip-flops, each flip-flop having 'D', 'C' and 'S' inputs and Q and $\overline{Q}$ outputs, one flip-flop has its 'C' and 'D' inputs connected to different coil means, a pair of inverters connecting the 'C' and 'D' inputs of another flip-flop to different coil means so that when the pulse signal at the 'D' inputs are at high logic levels, rising pulses at the 'C' inputs causes the flip-flops to provide high logic level signals at their Q outputs and when the pulse signal at the 'D' inputs are at low logic levels, rising pulses at the 'C' inputs cause the flip-flops to provide low logic level signals at their Q outputs, an OR gate connected to the Q outputs of the two flip-flops which provides a high logic level output when at least one of the two flip-flops provides a high logic level signal at its Q output and provides a low logic level signal when the two flip-flops provide low logic level signals at their Q outputs, and the remaining flip-flop has its 'C' input connected to control pulse means, its $\overline{Q}$ output connected to the fourth AND gate, its 'S' input connected to the OR gate and being triggered to a set state when the OR gate provides a high logic level signal so as to provide a low logic level signal at its $\overline{Q}$ output as the detection signal to control the fourth AND gate to block the 'enter' pulses and returning to a clear state when a disabling pulse from the control pulse means is applied to its 'C' input so as to provide a high logic level signal at its $\overline{Q}$ output as the detection signal to control the fourth AND gate to pass the 'enter' pulses.

* * * * *